United States Patent
Kindersley

[19]

[11] Patent Number: 5,947,157
[45] Date of Patent: Sep. 7, 1999

[54] THROTTLING DEVICE AND ELEMENT

[76] Inventor: Peter Kindersley, c/o Engineered Valves International Inc., P.O. Box 3201, Glens Falls, N.Y. 12801

[21] Appl. No.: 08/570,631

[22] Filed: Dec. 11, 1995

[51] Int. Cl.$^6$ ........................................................ F15D 1/02
[52] U.S. Cl. ............................................... 138/45; 138/46
[58] Field of Search .................................. 138/45, 43, 46, 138/104, 140

[56] References Cited

U.S. PATENT DOCUMENTS

| | | |
|---|---|---|
| 588,415 | 8/1897 | Foster . |
| 850,622 | 4/1907 | Clark . |
| 1,437,423 | 12/1922 | Jackson ...................................... 138/45 |
| 1,839,672 | 1/1932 | Hamon ...................................... 138/45 |
| 2,515,948 | 7/1950 | Cyr . |
| 2,678,066 | 5/1954 | Carter ........................................ 138/45 |
| 2,685,294 | 8/1954 | Gold et al. . |
| 3,244,199 | 4/1966 | Hayes . |
| 3,321,970 | 5/1967 | Walker, Sr. et al. ....................... 138/45 |
| 4,085,774 | 4/1978 | Bauman .................................... 138/45 |
| 4,130,128 | 12/1978 | Kaneko ..................................... 138/45 |
| 4,138,849 | 2/1979 | Wilber ....................................... 138/45 |
| 4,224,794 | 9/1980 | Woollenweber . |
| 4,295,493 | 10/1981 | Bey ........................................... 138/45 |
| 4,353,388 | 10/1982 | Isoyama et al. ........................ 137/240 |
| 4,899,981 | 2/1990 | Thomas, Jr. . |
| 5,156,190 | 10/1992 | Staley, Jr. ................................ 138/104 |
| 5,452,677 | 9/1995 | Kirkpatrick ............................. 138/140 |

Primary Examiner—James F. Hook
Attorney, Agent, or Firm—Nixon & Vanderhye P.C.

[57] ABSTRACT

A throttling element, and throttling device utilizing the throttle element, provide absolute minimum possible resistance when in the fully opened position yet easily and effectively throttles the flow, so as to introduce a variable pressure drop, upon rotation utilizing conventional actuators. The device cannot be closed off completely, and it is possible to produce it in the same cost range as for butterfly valves yet having significant advantages thereover. The throttling element includes an annular metal substantially spherical segment having an exterior arcuate extent of about 80° or less (e.g. about 60–70°) with first and second elongated metal shaft stubs extending radially outwardly from the exterior of the annular substantially spherical segment, on opposite of the segment the dimension of elongation of the shaft stubs. The element may be mounted in a housing having an interior bore with a first diameter, the throttling element itself having an interior bore with a second diameter substantially the same as the first diameter so that minimum resistance to flow is provided in a fully open position. The width of the exterior extension of the throttling element is between about 50%–70% of the first diameter with the first width and second diameter mentioned so that the throttling element cannot preclude or substantially preclude fluid flow through the housing interior bore regardless of what position the throttling element is rotated to. The housing may be two piece only slightly wider than the throttling element.

19 Claims, 4 Drawing Sheets

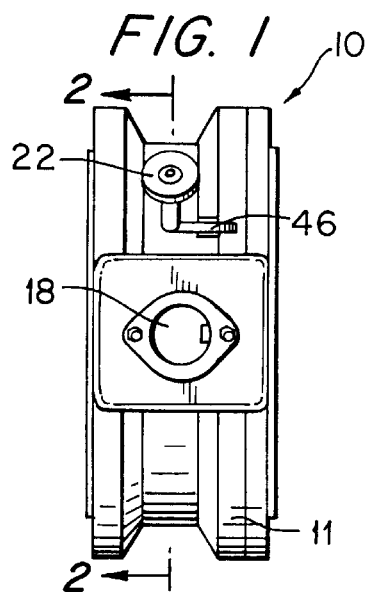
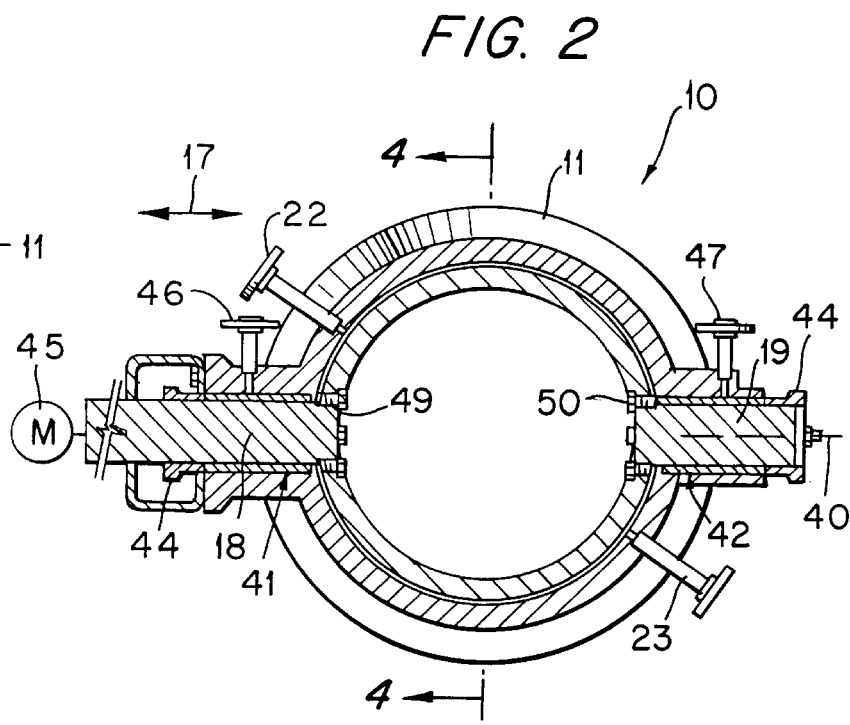
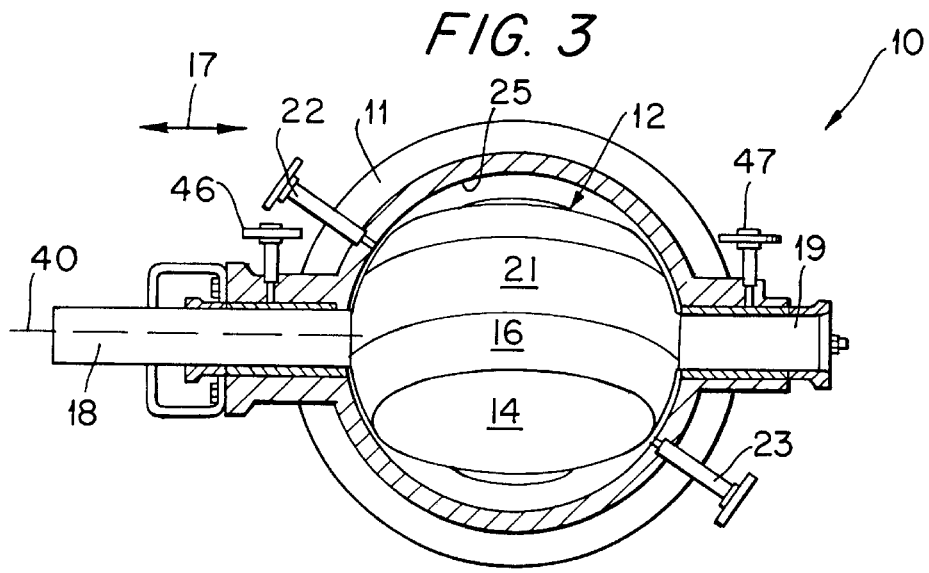

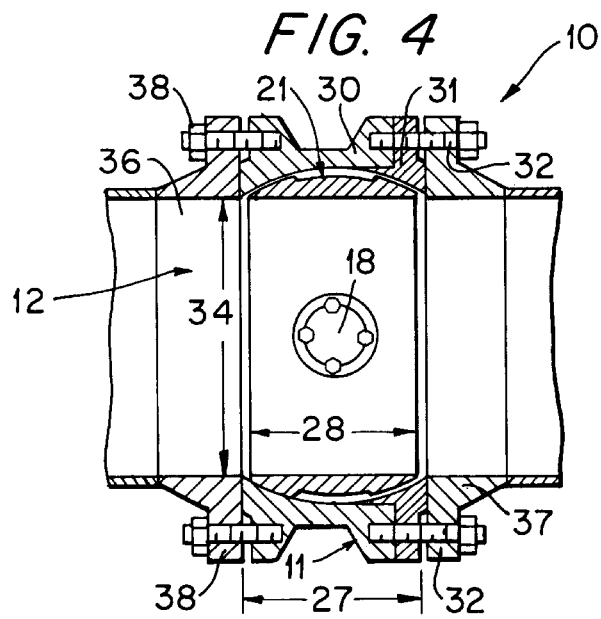
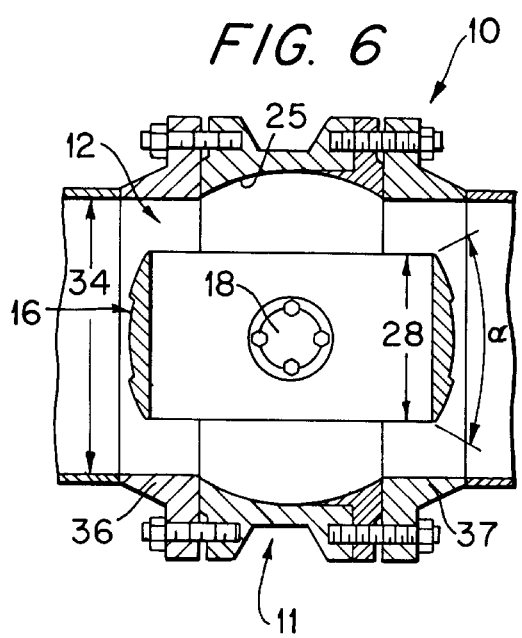

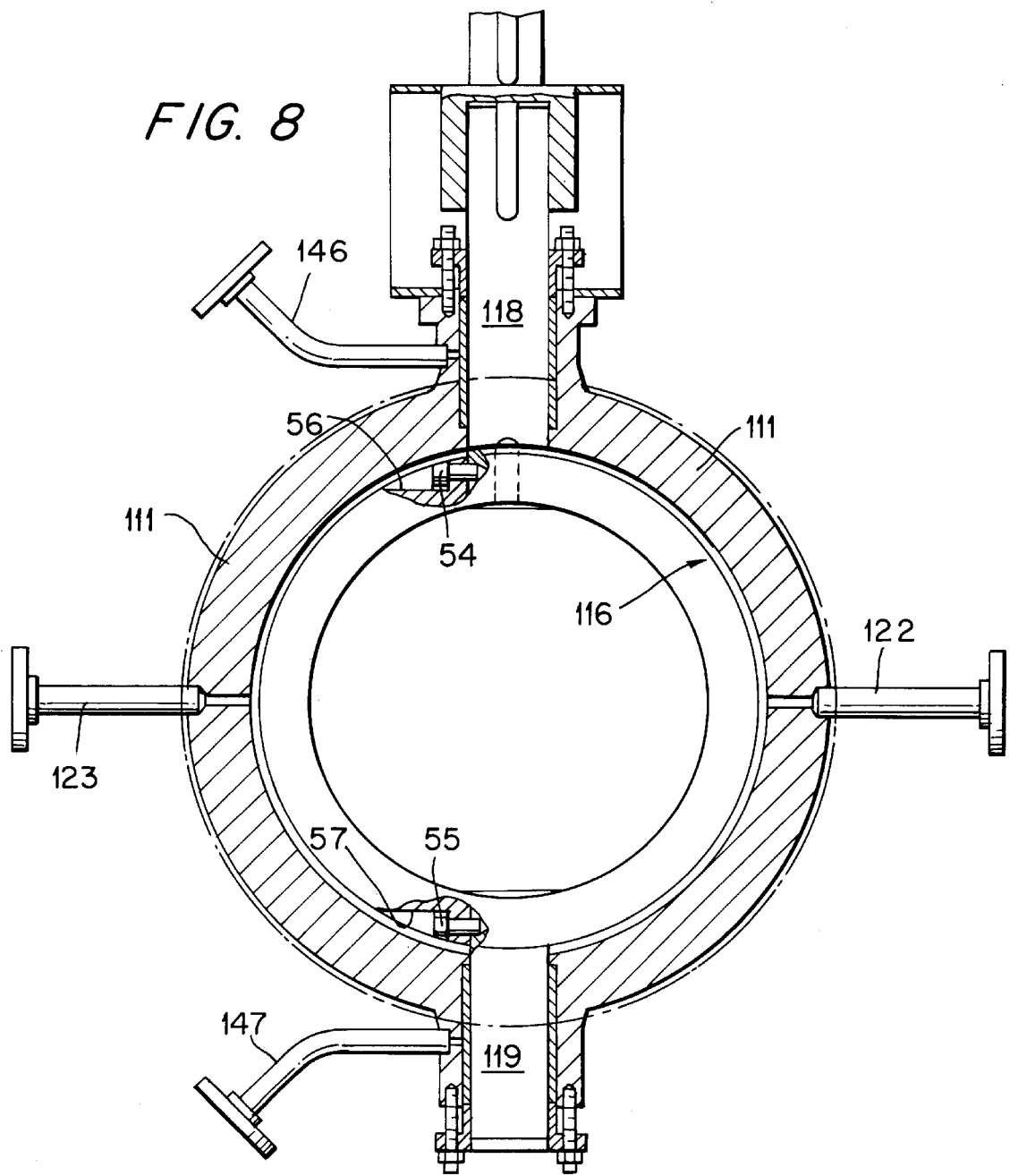

THROTTLING DEVICE AND ELEMENT

BACKGROUND AND SUMMARY OF THE INVENTION

There are many situations in which a throttling device having a variable area of opening is useful to introduce a variable pressure drop in a chemical or industrial system in which fluid is transported from one place to the other. Under most circumstances, it is important that an absolute minimum resistance to flow is provided in a fully open position, to maximize flow, maximize energy conservation, and/or to minimize upstream pressure. Also in many circumstances it is important that the throttling device not be completely closable since that may disturb system flows, so that serious process upsets occur, or even dangerous conditions.

In order to obtain effective throttling with an absolute minimum pressure drop in the open position, oftentimes a line size full bore ball valve is used, with a minimum height and opening stop added where necessary. However, in many situations the cost of that type of valve is prohibitive, in which case a butterfly valve is often substituted. However, a butterfly valve compromises the objective of lowest possible resistance in the open position. Sometimes gate valves are utilized; however, they have the problems of deposits from flowing fluid get caught in the gate recess in the body, preventing proper stroking of the valve, and also the throttling characteristics and efficiency are not as good as for ball valves or butterfly valves.

According to the present invention a throttling element for a throttling device, and throttling device per se, are provided which combine all of the advantages of the butterfly and full bore ball valves with none of the disadvantages. According to the present invention a throttling device is provided that has a full bore when wide open, throttling capability which is easily and positively adjusted, and is designed so that it cannot completely close (or substantially completely close) off the line, yet it has a cost that is significantly less than conventional full bore balls and typically in the same range of cost as butterfly valves.

The throttling device according to the present invention may be utilized in a wide variety of different environments. For example, one environment is in the field of heating and ventilating where air delivery systems must be balanced in various parts by adjusting valve openings, and when low resistance is needed, an absolute lowest possible resistance improving energy efficiency dramatically. Also, the throttling device according to the invention finds significant use in the field of manufacture of petroleum coke. In that field it is often required to warm up the next drum to be filled using the hot (850–900° F.) vapors coming from the drum that is still being filled. To force some of the vapors to flow through the drum that is to be warmed up a back pressure valve is typically provided in the return line to the fractionator, the back pressure valve being a throttling valve which creates a pressure rise upstream of the valve thereby forcing some of the vapors to flow into the drum to be warmed up. When used in the throttle mode to create a pressure drop, it is important that this valve not be allowed to close fully since to do so would upset the process. By utilizing the valve according to the present invention even in this unusual and demanding environment containing high temperature, and contaminants in the fluid being throttled, which may result in solids build up on surfaces, the throttling device according to the invention is very effective. The invention is also effective in a wide variety of other environments.

According to one aspect of the present invention a throttling element per se is provided comprising: An annular metal substantially spherical segment having an exterior arcuate extent of about 80° or less. And first and second elongated metal shaft stubs extending radially outwardly from the exterior of the annular substantially spherical segment, on opposite sides of the segment in the dimension of elongation of the shaft stubs. For example, the exterior arcuate surface extent may be about 60–70°. A scalloped circumferential passage may be provided surrounding the arcuate exterior of the segment and extending substantially perpendicular to the shaft stubs.

While the shaft stubs may be integral with the segment, they also may be separable. One exemplary way that they may be separable is to provide each of the shaft stubs with at least one key-receiving slot parallel to the dimension of elongation and at least one key extending between the segmented shaft disposed in the slot for holding a shaft stub to the segment. A bore may be formed in the segment exterior adjacent each of the shaft stubs through which a key extends into association with a slot.

The throttling element typically provided in combination with the housing having an interior bore with a first diameter and a substantially spherical second interior surface cooperating with the throttling element exterior, the housing receiving the shaft stub so that the throttling element is rotatable about an axis defined by the stubs. The annular throttling element has an interior bore with a second diameter, the second diameter substantially the same as the first diameter so that the throttling element provides minimum resistance of fluid flow through the housing interior bore when in a fully open position, and wherein the second diameter and the arcuate extent of the segment are so dimensioned that the throttling element cannot preclude or substantially preclude flow through the housing interior bore regardless of what position it is rotated to about the axis.

The housing may have a width between first and second sides thereof that is only slightly greater than the annular segment width, and first and second housing extensions may extend from the first and second sides of the housing. A spacing is typically provided between the substantially spherical segment interior of the housing and the exterior of the annular segment, the spacing typically being between about 0.25–0.5 inches, and substantially uniform (although slightly greater where the scalloped circumferential passage is provided, when utilized). The housing may be two piece having a parting line substantially parallel to the axis, and releasable fasteners (e.g. bolts) may be provided for holding the housing pieces together at the parting line during operation and releasable to allow removal of the annular segment. Typically the annular element has a width that is between about 50%–70% of the first diameter.

According to another aspect of the present invention a throttling device is provided comprising the following components: A housing having an interior bore with a first diameter through which fluid to be throttled flows. An annular throttling element. Means for mounting the throttling element to the housing for rotation about an axis substantially perpendicular to the housing bore. The throttling element having an interior bore with a second diameter, the second diameter substantially the same as the first diameter so that the throttling element provides minimum resistance of fluid flow through the housing interior bore when in a fully open position. And the throttling element having an exterior extent with a first width, and wherein the second diameter and the first width are so dimensioned that the throttling element cannot preclude or substantially preclude fluid flow through the housing interior bore regardless of what position the throttling element is rotated to about the axis.

The details of the throttling element, and the housing, preferably are as described above. At least one steam purge connection may also be provided to the circumferential passage on each side of the shaft stubs. The rotating means may comprise first and second shaft stubs, or may comprise only a single shaft stub, or multiple shaft stubs, or other surface manifestations beside shaft stubs, or simply bearing surfaces themselves depending upon the particular use to which the device is put. Whatever the rotating means, it typically is readily connected up to conventional and standard rotary actuators, which may be either hand, electric, pneumatic, hydraulic, or otherwise operated.

It is a primary object of the present invention to provide the throttling of fluid flow using a device which has the absolute minimum possible pressure drop in the open position, effectively and accurately throttles in a wide variety of ranges (e.g. providing throttling of any amount between 0% to about 70%), yet has the same cost range as a butterfly valve, and will not be severely adversely affected by contaminants in the fluid being throttled, and is easy to service or replace. This and other objects of the invention will become clear from an inspection of the detailed description of the invention and from the appended claims.

BRIEF DESCRIPTION OF THE DRAWINGS

FIG. 1 is a top plan view of an exemplary throttling device according to the present invention;

FIG. 2 is a longitudinal cross sectional view taken generally along the lines 2—2 of the throttling device of FIG. 1, only showing all of the steam purge connections in elevation;

FIG. 3 is a view like that of FIG. 2 only showing the shaft stubs in elevation also, and showing the throttling element rotated from the full bore open position of FIG. 2 to a throttling position;

FIGS. 4 through 6 are transverse cross sectional views taken generally along the lines 4—4 of FIG. 2 and showing a throttling device according to the present invention in fully open (FIG. 4), maximum throttling (FIG. 5), and another throttling (FIG. 6), positions;

FIG. 8 is a view like that of FIG. 2 for the second embodiment of FIG. 7, only showing the shaft stubs and throttling element in elevation.

DETAILED DESCRIPTION OF THE DRAWINGS

Figure 7:
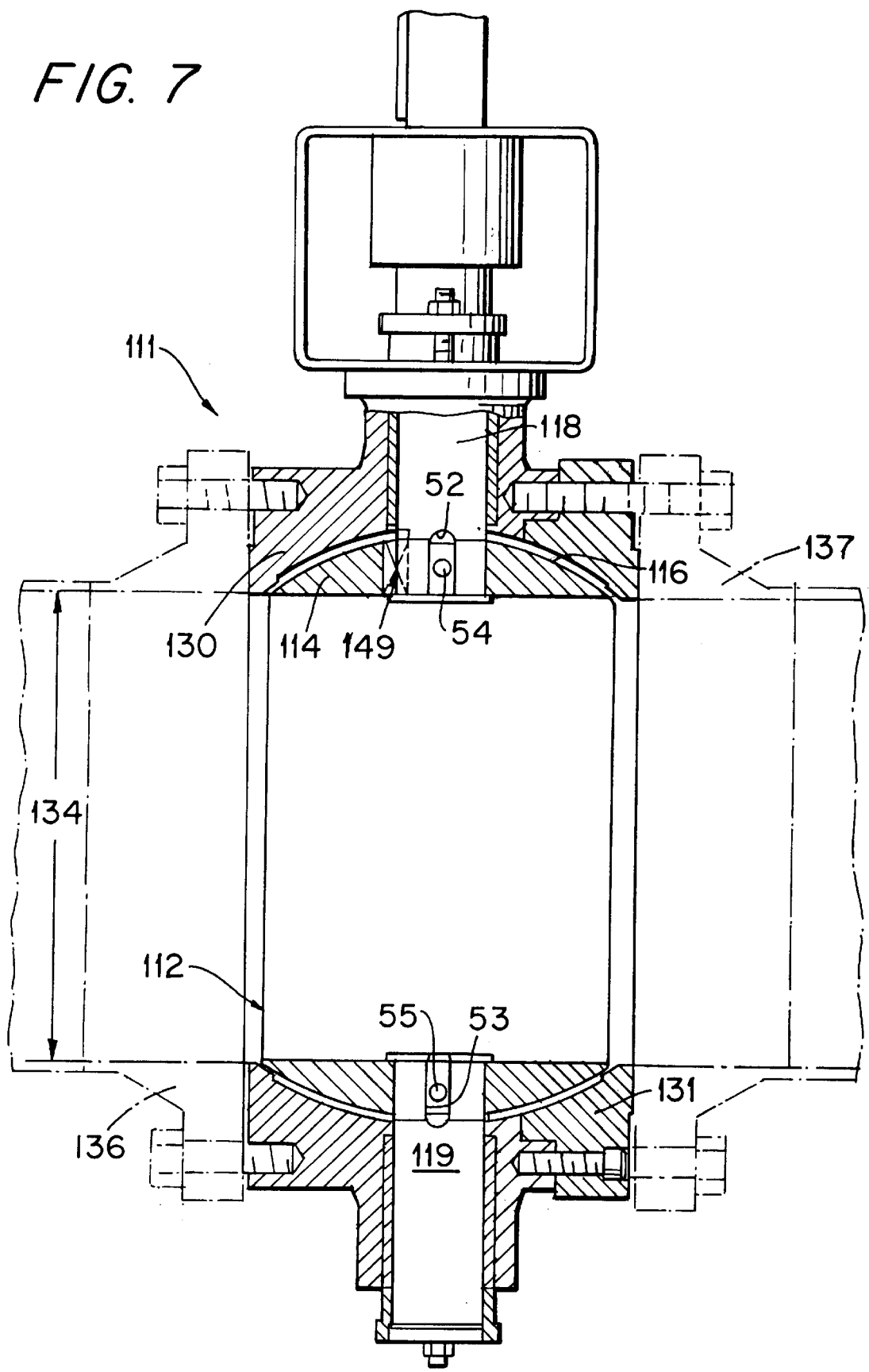
FIG. 7 is a longitudinal cross sectional view, showing the shaft stubs in elevation, of a second embodiment of a throttling device according to the present invention and shown in connection with conduits on opposite sides of the housing, the view of FIG. 7 being a substantially 90° rotation from that of FIG. 2.

A first embodiment of an exemplary throttling device according to the present invention is shown generally by reference numeral 10 in FIGS. 1 through 6. The two major components of the throttling device 10 comprise a housing, shown generally by reference numeral 11, and a throttling element, shown generally by reference numeral 12. Both are preferably made out of metal, the particular metal utilized dependent upon the environment in which it will be used (e.g. the temperature, pressure, and particular fluid being throttled, conditions).

The throttling element 12 preferably comprises an annular substantially spherical segment (the sphericality thereof being best seen in FIGS. 3 through 6), having an interior bore 14 having a diameter 15 (see FIG. 5), as well as a substantially spherical exterior surface 16. First and second elongated (in the dimension 17) metal shaft stubs 18, 19 are provided extending radially outwardly from the surface 16, as seen in FIGS. 2 and 3, on opposite sides thereof and in a dimension of elongation 17. The shaft stubs 18, 19 may be formed integrally with the spherical segment 16, or may be attached thereto by any suitable means, one of which will be described with respect to the FIGS. 7 and 8 embodiment.

With particular regard to FIG. 6 where it is illustrated most clearly, the substantially spherical surface 16 has an arcuate extent $\alpha$. That arcuate extent a typically is about 80° or less, e.g. between about 60–70°, as illustrated in FIG. 6.

Note that the spherical segment 16 may be made in any suitable way. For example, it may be made from a strip of material which is bent and closed and welded together at its ends, with the exterior machined so that it is substantially spherical. Alternatively it may be cast, molded, cut and machined from a block, or the like. Also, it may be desirable to provide a scalloped circumferential passage, such as the passage 21 (best seen in FIGS. 3 and 4), and steam purge connections (such as the connections 22 and 23 schematically illustrated in FIGS. 2 and 3) may be provided communicating with the passage 21 when the throttling element 12 is in the full open position in FIG. 2.

As seen in all of FIGS. 2 and 3, the housing 11 preferably has an interior surface—indicated by reference numeral 25 in FIGS. 3, 5 and 6—which is also substantially spherical, and cooperates with the segment exterior 16. Note in the preferred embodiment illustrated in FIGS. 1 through 6 that the housing 11 also has a small width 27 which is not significantly greater than the width 28 (see FIGS. 4 and 6) of the throttling element 12. The housing 11 also preferably is two piece, such as indicated by pieces 30 and 31 in FIG. 4, and pieces 30, 31 are typically fastened together by releasable fasteners, such as the bolts 32 illustrated in FIG. 4, although permanent connection (such as by welding, soldering), or any other conventional type of fastener, may be used depending upon the circumstances.

The housing 11 has a diameter 34, as illustrated in FIG. 4. This diameter 34 is substantially equal to the diameter 15. In this way when the device 10 is in the full bore open position (FIGS. 2 and 4) the throttling element 12 offers absolute minimum resistance to the flow of fluid therethrough. On either side of the housing 11 are typically also housing extensions (part of a conduit or piping system), such as illustrated at 36 and 37 in FIGS. 4 through 6, the same bolts 32 connecting the extension 37 to the housing piece 31, and bolts 38 or like fasteners connecting the extension 36 to the housing piece 30. As seen in the drawings the extensions 36, 37 have an interior bore with a diameter that is the same, or substantially the same, as the diameter 34 (and the diameter 15).

The throttling element 12 shaft stubs 18,19 are received within the housing 11 by any suitable conventional mechanism, the particular mechanism not being particularly important, merely providing for positive rotation about an axis, such as the axis 40 in FIGS. 2 and 3. Conventional packings or bearings, shown schematically by reference numerals 41 and 42 in FIG. 2, may be provided for allowing rotation of the shaft stubs 18, 19 about the axis 40. For example (and example only), simple die-formed high density graphite rings may be provided as the bearings 41, 42, with a conventional packing gland 44 or the like. However, any other suitable conventional packing and/or bearing elements may be provided.

Typically the shaft stub 18 is rotated by an actuator, such as the electric motor illustrated schematically at 45 in FIG. 2. However, any conventional manual, electric, pneumatic, hydraulic, or like actuator may be provided for rotating the throttling element 12 about the axis 40.

Steam purge connections 46, 47 may be provided mounted in association with the bearings 41, 42.

Note that there is no seating surface in the device 10 because one is not necessary since even in the maximum throttling position—illustrated in FIG. 5—the interior bore (having a diameter 34) is not completely closed off (typically no more than about a 70% throttling action is provided). In the preferred embodiment the width 28 and diameter 15 are selected compared to the diameter 34 so that maximum throttling position is that as generally illustrated in FIG. 5. For example, the width 28 is typically between about 33%–50% of the diameter 34, as seen in FIG. 6 where the width 28 is approximately 50% of the diameter 34. Note that in the preferred embodiment the element 12 may be moved to essentially any angular position between the positions of FIGS. 4 and 6. Driving torque is small since the element 12 is essentially self-balancing, without reactive torque from the flow. Torque transmission (from the stub 18 to the segment 16 and stub 19) can be through cap screws since they can be located in the crack between the shaft and ring bore, or key ways may be cut in the parts and square keys used. Bend-tab washers could also be used under the heads of the cap screws and bent over hexagonal flats to prevent them from working loose. The holes in the element 16 which receives the shaft stubs 18, 19—which holes are illustrated schematically at 49, 50 in FIG. 2—where one piece construction is not provided—may be conical with the matching conical shaft ends and cap screws to hold the shaft stubs tightly into the cones. In this way the shaft stubs are blowout-proof and they will not wobble in the joints that could wear into a loose fit.

FIGS. 7 and 8 show a slightly modified embodiment, differing from that of FIGS. 1 through 6 in minor details. This embodiment has components comparable to those in the FIGS. 1 through 6 embodiment and are illustrated by the same reference only preceded by a "1".

As seen in both FIGS. 7 and 8, in this embodiment a key connection is provided between the shaft stubs 118, 119 and the element 116. Slots 52, 53 (see FIG. 7) that are elongated in the dimension of elongation of the shaft stubs 118, 199 are provided therein and receive the keys 54, 55, respectively. These keys 54, 55 extend in bores 56, 57 (see FIG. 8) in the element 116.

In the standard assembly and operation of the throttling device 10, with the bolts 32 removed the throttling element 16 is properly positioned in contact with the housing piece 30, with the piece 31 then being brought into place and the bolts 32 tightened in the housing pieces 30, 31 mesh along the parting line 60 (see FIG. 4). The bearings 41, 42 are inserted as well as the packing glands. The bolts 38 attach the housing piece 30 to the extension 36.

When the device 10 is to be in the fully opened, minimum resistance position, the motor 45 or the like is actuated to turn to the position illustrated in FIGS. 2 or 4, wherein there is a smooth passageway provided between the extensions 36, 37, unrestricted by the throttling element 16. Various degrees of throttling may be provided by actuating the actuator 45 to rotate the element 16 about the axis 40 defined by the shaft stubs 18, 19, all the way to the full throttling (but non-occluding) position in FIG. 5. The degree of throttling is adjusted as desired.

It will thus be seen that according to the present invention an advantageous throttling device and throttling element are provided. According to the invention throttling is provided so that there is absolutely minimum resistance when in the fully open position, yet the throttling mechanism will not easily become clogged, and reliably operates in a wide variety of throttling positions, yet will not occlude (or substantially occlude) passage of fluid through the device. Yet despite these advantages the throttling device of the invention can be produced at a cost in the same cost range as a butterfly valve. Thus, the invention is to be accorded the broadest interpretation of the appended claims so as to encompass all equivalent structures and devices.

What is claimed is:

1. A throttling element comprising:

an annular metal substantially spherical segment having an exterior arcuate spherical extent that is solid and between about 60–70°; and first and second elongated metal shaft stubs extending radially outwardly from said exterior of said annular substantially spherical segment exterior, on opposite sides of said segment.

2. A throttling element as recited in claim 1 further comprising a scalloped passage formed in said arcuate exterior of said segment.

3. A throttling element as recited in claim 1 wherein each of said shaft stubs includes at least one key-receiving slot parallel to said dimension of elongation, and further comprising at least one key extending between said segment and said shaft disposed in said slot and for holding said shaft stub to said segment.

4. A throttling element as recited in claim 3 further comprising a bore formed in said segment exterior adjacent each of said shaft stubs, through which a said key extends into association with a said slot.

5. A throttling element [as recited in claim 1] comprising:

an annular metal substantially spherical segment having an exterior arcuate spherical extent that is solid and between about 60–70°; and first and second elongated metal shaft stubs extending radially outwardly from said exterior of said annular substantially spherical segment exterior, on opposite sides of said segment; and in combination with a housing having an interior bore with a first diameter and a substantially spherical segment interior surface cooperating with said throttling element exterior, said housing receiving said shaft stubs so that said throttling element is rotatable about an axis defined by said shaft stubs; and wherein said annular throttling element has an interior bore with a second diameter, said second diameter substantially the same as said first diameter so that said throttling element provides minimum resistance of fluid flow through said housing interior bore when in a fully open position, and wherein said second diameter and said arcuate extent of said segment are so dimensioned that said throttling element cannot preclude or substantially preclude flow through said housing interior bore regardless of what position it is rotated to about said axis.

6. A throttling element and housing combination as recited in claim 5 further comprising a spacing between said substantially spherical segment interior of said housing and exterior of said annular segment which is between about 0.25–0.5 inches.

7. A throttling element and housing combination as recited in claim 5 wherein said housing has a width, between first and second sides thereof, only slightly greater than said annular segment width; and further comprising first and second housing extensions extending from said first and second sides of said housing.

8. A throttling element and housing combination as recited in claim 7 wherein said housing is two piece, having a parting line substantially parallel to said axis; and further comprising releasable fasteners for holding said housing pieces together at said parting line during operation, and releasable to allow removal of said annular segment.

9. A throttling element and housing combination as recited in claim 5 wherein said annular element has a width that is about 50% of said first diameter.

10. A throttling device comprising:
   a housing having an interior bore with a first diameter through which fluid to be throttled flows;
   an annular throttling element;
   means for mounting said throttling element to said housing for rotation of said throttling element about an axis substantially perpendicular to said housing bore;
   said throttling element having an interior bore with a second diameter, said second diameter substantially the same as said first diameter so that said throttling element provides minimum resistance of fluid flow through said housing interior bore when in a fully open position; and
   said throttling element having an exterior extent with a first width, and wherein said second diameter and said first width are so dimensioned that said throttling element cannot preclude or substantially preclude fluid flow through said housing interior bore regardless of what position said throttling element is rotated to about said axis.

11. A throttling device as recited in claim 10 wherein said first width is between about 50% of said first diameter.

12. A throttling device as recited in claim 10 wherein said housing has a second width, between first and second sides thereof, said second width only slightly greater than said first width.

13. A throttling device as recited in claim 12 further comprising first and second housing extensions extending from said first and second sides of said housing.

14. A throttling device as recited in claim 13 wherein said housing is two piece, having a parting line substantially parallel to said axis; and further comprising releasable fasteners for holding said housing pieces together at said parting line during operation, and releasable to allow removal of said throttling element.

15. A throttling device as recited in claim 10 wherein said housing has an interior substantially spherical segment and wherein said exterior of said annular throttling element is substantially spherical and disposed within said housing substantially spherical segment; and further comprising a spacing between said substantially spherical segment interior of said housing and exterior of said annular segment which is between about 0.25–0.5 inches.

16. A throttling device as recited in claim 10 wherein said exterior of said annular throttling element is solid and substantially spherical.

17. A throttling device as recited in claim 10 wherein said means for rotating said throttling element about said axis comprises first and second shaft stubs extending from opposite sides of said throttling element and received within said housing.

18. A throttling element as recited in claim 17 wherein said throttling element has an arcuate exterior; and further comprising a scalloped passage formed in said arcuate exterior of said throttling element.

19. A throttling device as recited in claim 10 further comprising at least one steam purge connection to said circumferential passage on each side of said shaft stubs for purging steam from between said element and said housing.

* * * * *